United States Patent
Shu et al.

(10) Patent No.: US 12,437,492 B2
(45) Date of Patent: Oct. 7, 2025

(54) CONTROLLABLE DYNAMIC APPEARANCE FOR NEURAL 3D PORTRAITS

(71) Applicant: Adobe Inc., San Jose, CA (US)

(72) Inventors: Zhixin Shu, San Jose, CA (US);
Zexiang Xu, San Jose, CA (US);
Shahrukh Athar, Stony Brook, NY (US); Sai Bi, San Jose, CA (US);
Kalyan Sunkavalli, Saratoga, CA (US);
Fujun Luan, San Jose, CA (US)

(73) Assignee: Adobe Inc., San Jose, CA (US)

( * ) Notice: Subject to any disclaimer, the term of this patent is extended or adjusted under 35 U.S.C. 154(b) by 234 days.

(21) Appl. No.: 18/132,272

(22) Filed: Apr. 7, 2023

(65) Prior Publication Data

US 2024/0338915 A1 Oct. 10, 2024

(51) Int. Cl.
*G06T 19/20* (2011.01)
*G06N 3/08* (2023.01)
(Continued)

(52) U.S. Cl.
CPC .............. *G06T 19/20* (2013.01); *G06N 3/08* (2013.01); *G06T 15/80* (2013.01); *G06T 17/20* (2013.01);
(Continued)

(58) Field of Classification Search
CPC ......... G06T 19/20; G06T 15/80; G06T 17/20; G06T 2210/44; G06T 2219/2012;
(Continued)

(56) References Cited

U.S. PATENT DOCUMENTS

| | | | |
|---|---|---|---|
| 6,570,546 B1 * | 5/2003 | Welker | G06F 3/1446 345/11 |
| 10,565,758 B2 | 2/2020 | Hadap et al. | |

(Continued)

FOREIGN PATENT DOCUMENTS

| | | |
|---|---|---|
| WO | 2022140445 A1 | 6/2022 |
| WO | 2022248042 A1 | 12/2022 |

OTHER PUBLICATIONS

Blanz, Volker., et al., "A morphable model for the synthesis of 3D faces." Proceedings of the 26th annual conference on Computer graphics and interactive techniques, 1999., pp. 187-194.
(Continued)

*Primary Examiner* — Sheree N Brown
(74) *Attorney, Agent, or Firm* — Kilpatrick Townsend & Stockton LLP

(57) ABSTRACT

Certain aspects and features of this disclosure relate to providing a controllable, dynamic appearance for neural 3D portraits. For example, a method involves projecting a color at points in a digital video portrait based on location, surface normal, and viewing direction for each respective point in a canonical space. The method also involves projecting, using the color, dynamic face normals for the points as changing according to an articulated head pose and facial expression in the digital video portrait. The method further involves disentangling, based on the dynamic face normals, a facial appearance in the digital video portrait into intrinsic components in the canonical space. The method additionally involves storing and/or rendering at least a portion of a head pose as a controllable, neural 3D portrait based on the digital video portrait using the intrinsic components.

20 Claims, 8 Drawing Sheets

(51) Int. Cl.
  *G06T 15/80* (2011.01)
  *G06T 17/20* (2006.01)
(52) U.S. Cl.
  CPC .. *G06T 2210/44* (2013.01); *G06T 2219/2012* (2013.01); *G06T 2219/2021* (2013.01)
(58) Field of Classification Search
  CPC . G06T 2219/2021; G06T 13/40; G06T 17/00; G06T 5/60; G06T 2207/30201; G06N 3/08; G06V 40/174; G06V 40/20
  USPC .......................................................... 345/419
  See application file for complete search history.

(56) References Cited

U.S. PATENT DOCUMENTS

| | | | | |
|---|---|---|---|---|
| 2023/0154101 | A1* | 5/2023 | Bradley | G06T 15/04 345/426 |
| 2024/0062495 | A1* | 2/2024 | Shu | G06T 17/00 |

OTHER PUBLICATIONS

Feng, Yao, et al. "Learning an animatable detailed 3d face model from in-the-wild images." ACM Transactions on Graphics (ToG) 40.4, 2021, pp. 1-13.

Guo, Jianzhu, et al. "Towards fast, accurate and stable 3d dense face alignment." Computer Vision-ECCV 2020: 16th European Conference, Glasgow, UK, Aug. 23-28, 2020, Proceedings, Part XIX. Cham: Springer International Publishing, 2020, pp. 1-17.

Li, Tianye, et al. "Learning a model of facial shape and expression from 4D scans", ACM Trans. Graph. 36.6, 2017, pp. 194-1-194-17.

Mildenhall, Ben, et al. "Nerf: Representing scenes as neural radiance fields for view synthesis", Communications of the ACM 65.1, Jan. 2022, pp. 99-106.

Park, Keunhong, et al. "Nerfies: Deformable neural radiance fields." Proceedings of the IEEE/CVF International Conference on Computer Vision, 2021, pp. 5865-5874.

Park, Keunhong, et al., "Hypernerf: A higher-dimensional representation for topologically varying neural radiance fields", arXiv preprint arXiv:2106.13228, 2021, pp. 1:1-1:16.

Pumarola, Albert, et al., "D-nerf: Neural radiance fields for dynamic scenes", Proceedings of the IEEE/CVF Conference on Computer Vision and Pattern Recognition, 2021, pp. 10318-10327.

Athur, Shahrukh, et al., "FLAME-in-NeRF: Neural Control of Radiance Fields for Free View Face Animation," 2023 IEEE 17th International Conference on Automatic Face and Gesture Recognition (FG), 2023, pp. 1-8.

Athur, Shahrukh, et al,"Rignerf: Fully Controllable Neural 3D Portraits." Proceedings of the IEEE/CVF conference on Computer Vision and Pattern Recognition. 2022, pp. 20332-20341.

GB Application No. GB2401565.3 Combined Search and Examination Report, Aug. 5, 2024, pp. 1-7.

* cited by examiner

CONTROLLABLE DYNAMIC APPEARANCE FOR NEURAL 3D PORTRAITS

TECHNICAL FIELD

The present disclosure generally relates to producing dynamic, three-dimensional (3D), moving portraits. More specifically, but not by way of limitation, the present disclosure relates to programmatic techniques for controlling head movement and expression in digitally rendered portraits while providing realistic lighting effects.

BACKGROUND

Photo-realistic human portraits consist of digitally generated video rendered with explicit control of head pose, facial expression and/or eye gaze. Controllable 3D portraits are used in augmented reality (AR) and virtual reality (VR) applications, where an immersive, 3D experience is desirable. A controllable 3D portrait can be produced in some examples by first digitally recording an individual to create and store a video for training. The video is captured under controlled lighting conditions so that even illumination and consistent color are provided across all visible surfaces of the head of the subject. The head can then be volumetrically rendered with explicit control of movement over a stream of video frames.

SUMMARY

Certain aspects and features of the present disclosure relate providing a controllable, dynamic appearance for neural 3D portraits. For example, a method involves projecting a color at points in a digital video portrait based on location, surface normal, and viewing direction for each respective point in a canonical space. The method also involves projecting, using the color, dynamic face normals for the points as changing according to an articulated head pose and facial expression in the digital video portrait. The method further involves disentangling, based on the dynamic face normals, a facial appearance in the digital video portrait into intrinsic components in the canonical space. The method additionally involves storing and/or rendering at least a portion of a head pose as a controllable, neural three-dimensional portrait based on the digital video portrait using the intrinsic components.

Other embodiments include corresponding computer systems, apparatus, and computer programs recorded on one or more computer storage devices, each configured to perform the actions of a method.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
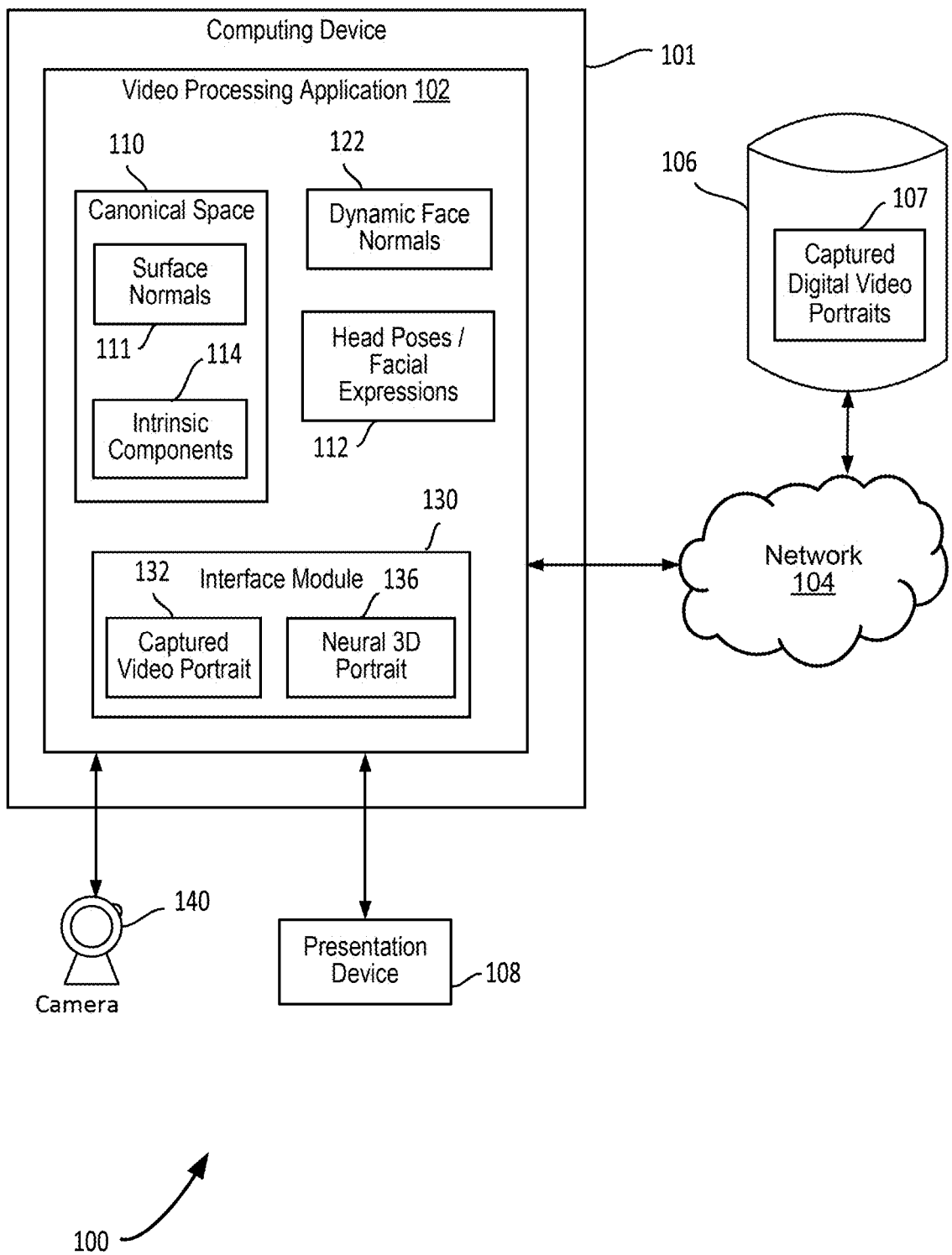
FIG. 1 is a diagram showing an example of a computing environment that provides a controllable, dynamic appearance for neural 3D portraits according to certain embodiments.

The capability to create photo-realistic moving human portraits can be important in computer graphics and computer vision. Fully controllable 3D portraits are valuable in AR/VR applications where an immersive 3D experience is desired. A controllable 3D portrait can be produced by digitally recording video of an individual to create and store a digital video portrait, and then rendering the head with deliberate control over movement.

To animate an image of a human head, a learnable deformation can be used to map the deforming head to a canonical space, where texture and geometry can be predicted and rendered. The deformation, geometry, and texture can be learned via back-propagation. For a system to successfully learn the deformation, texture, and geometry, training data should be photometrically well registered. More specifically, color should remain constant once mapped to a canonical space. The canonical space represents a static appearance of the head, akin to a UV texture map. Thus, video portrait capture to obtain an image for animation requires strict lighting conditions that are difficult to obtain in real-world capture conditions, where light sources can be arbitrarily placed in a scene causing cast-shadows, specularities and interreflections, all of which vary with changing head-pose, facial expression, and camera position. These limitations have restricted the creation of digital, animated portraits to professional environments.

Embodiments described herein address the above issues by providing a process for creating animated, photorealistic, neural 3D portraits with a controllable, dynamic appearance based on short videos photographically captured in any ambient lighting. Light sources can be arbitrarily placed, even to the point of casting shadows on the face being captured for training, or causing varying specularity and/or interreflections. A controlled lighting environment is not needed for the capture to produce realistically animated, controllable, neural 3D portraits. The elimination of the requirement for a controlled environment allows a training video of a subject to be captured on a mobile or otherwise less capable computing device with any lighting. The ability to use a training video captures with minimal preparation makes it possible, as an example, to quickly capture the necessary digital video portrait on an end-user device as a precursor to producing an animated portrait for a video, VR presentation, or AR presentation.

For example, a video processing application such as one used to create scenes for games, cinematic or television presentations, or AR environments is loaded with a short video of a person, where the video includes the head and face. The video can be made in any lighting, even lighting that results in self-shadowing of the face or varying skin reflectance as facial expressions change. The video includes the subject making various facial expressions and camera motion across various viewpoints. The video processing application programmatically disentangles the appearance of the person in the video portrait and captures dynamic lighting normals and specularity to train a model for the person in the video portrait. A controllable, 3D neural portrait can be produced. Input can be received by the video processing application to provide explicit control over how the video portrait is to be animated over time for use in a video presentation. This input can include detailed specifications for head position, facial movements and facial expressions over time. The finished video presentation can be stored as a video clip for later use, rendered to a display device for viewing, or both.

In some examples, the video processing application projects color at points in the digital video portrait based on location, surface normal, and viewing direction for each respective point in the canonical space. The video processing application produces the animated controllable neural 3D portrait by projecting dynamic face normals for the points as changing according to an articulated head pose and facial expression while disentangling the facial appearance in the digital video portrait into intrinsic components in the canonical space. The neural 3D portrait can then be explicitly controlled and rendered or stored as a video or a portion of a video.

In some examples, color is projected using a photometrically consistent albedo of the digital video portrait and the canonical space is defined with respect to the photometrically consistent albedo. Shading, and specularity at each of the respective points can also be used to project color. The image can be deformed at a point using a guided deformation field to provide the dynamic face normals using a 3D morphable model. Parameters for a neural radiance field can be trained to minimize the difference between expected color and ground truth for the points and the deformation field can be trained using coarse-to-fine and vertex deformation regularization.

The use of dynamic, projected face normals aligned with articulated pose and expression along with disentanglement of the facial appearance into components in the canonical space provides realistic animated neural 3D portraits of high quality and salience. These animated portraits can be quickly and easily produced with readily available hardware and from images captured in almost any convenient environment, regardless of lighting.

FIG. 1 is a diagram showing an example of a computing environment that provides a controllable, dynamic appearance for neural 3D portraits according to certain embodiments. The computing environment 100 includes a computing device 101 that executes a video processing application 102, a memory device 106, and a presentation device 108 that is controlled based on the video processing application 102. The memory device 106 is communicatively coupled to computing device 101 using network 104. Memory device 106 is configured to captured digital video portraits 107 for use as training images that can be input to the video processing application 102, in addition to or as an alternative to a video portrait that may be captured directly by the video processing application 102. In this example, the video processing application 102 includes canonical space 110, in which surface normals 111 and intrinsic components 114 of the digital portrait being processed reside. The video processing application 102 also includes stored image data for head poses and/or facial expressions 112 and stored dynamic face normals 122.

In the example of FIG. 1, video processing application 102 also includes an interface module 130. In some embodiments, the video processing application 102 uses input from a camera 140 to capture a digital video portrait 132 through interface module 130. The video processing application 102 neural 3D portrait 136 to be displayed on presentation device 108, which may be a touch screen display that also received user input. Embodiments as described herein can be implemented on many kinds of computing devices. Neural 3D portrait 136 has a controllable appearance, meaning input can be receive through an input device such as a mouse, keyboard, or touchscreen to control, at least, facial expression and head pose. These factors can be used, as an example, to combine the moving image with a voiceover that has been already recorded or a voiceover that is live.

An already recorded voice may be used to provide an animated cinematic or video presentation. Using such a controllable neural 3D portrait with a live voice can provide the function of a digital puppet. Computing device 101 can be implemented as either a real or virtual (e.g., cloud-based) computing device and can be implemented on any number of computing platforms, including but not limited to tablets, smartphones, workstations, desktops, or servers.

Figure 2:
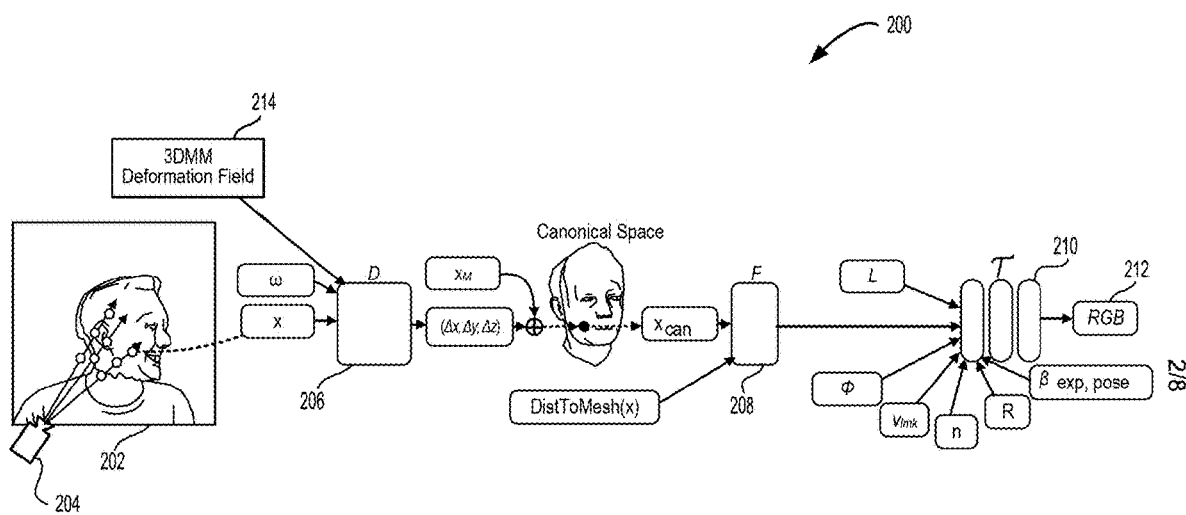
FIG. 2 is an example software architecture for providing controllable, dynamic appearance for neural 3D portraits according to certain embodiments.

FIG. 2 is an example software architecture 200 for providing controllable, dynamic appearance for neural 3D portraits according to certain embodiments. In FIG. 2, each pixel in a digital video portrait 202 is computationally illuminated with rays from a source 204. In this example, a description of points hit by each ray is processed by three multi-layer perception neural networks, also referred to as multi-layer perceptrons (MLPs). MLP 206 handles deformation D, MLP 208 handles a color density function F, and MLP 210 handles dynamic appearance $\mathcal{T}$. The controlled output in this example is provided as a dynamic RGB value 212 of each point in the neural 3D portrait that is ultimately stored or rendered.

For every ray in architecture 200, a point is deformed according to a 3D morphable model (3DMM) guided deformation field 214. The 3DMM value is provided to MLP 206 along with position information (x) and lighting information $\omega$. The deformed point is provided as 3D input to color MLP 208, which predicts the density and neural features that are passed onto the dynamic appearance MLP 210. Positional encoding $X_M$ for color and position in the canonical space $x_{can}$ is also provided, along with the distance to the mesh representation (DistToMesh(x)) in canonical space. MLP 210 takes as input normals, the reflection vector R about the normal n, the pose and expression deformations $\beta_{exp,pose}$ along with spherical harmonics shading and head landmark positions to predict the dynamic RGB values 212 of the point. MLP 210 also takes into account face landmarks $v_{lmk}$, lighting L for rendering, and the latent vector $\phi$ for each frame. The final color of the pixel is calculated via volume rendering.

Figure 3:
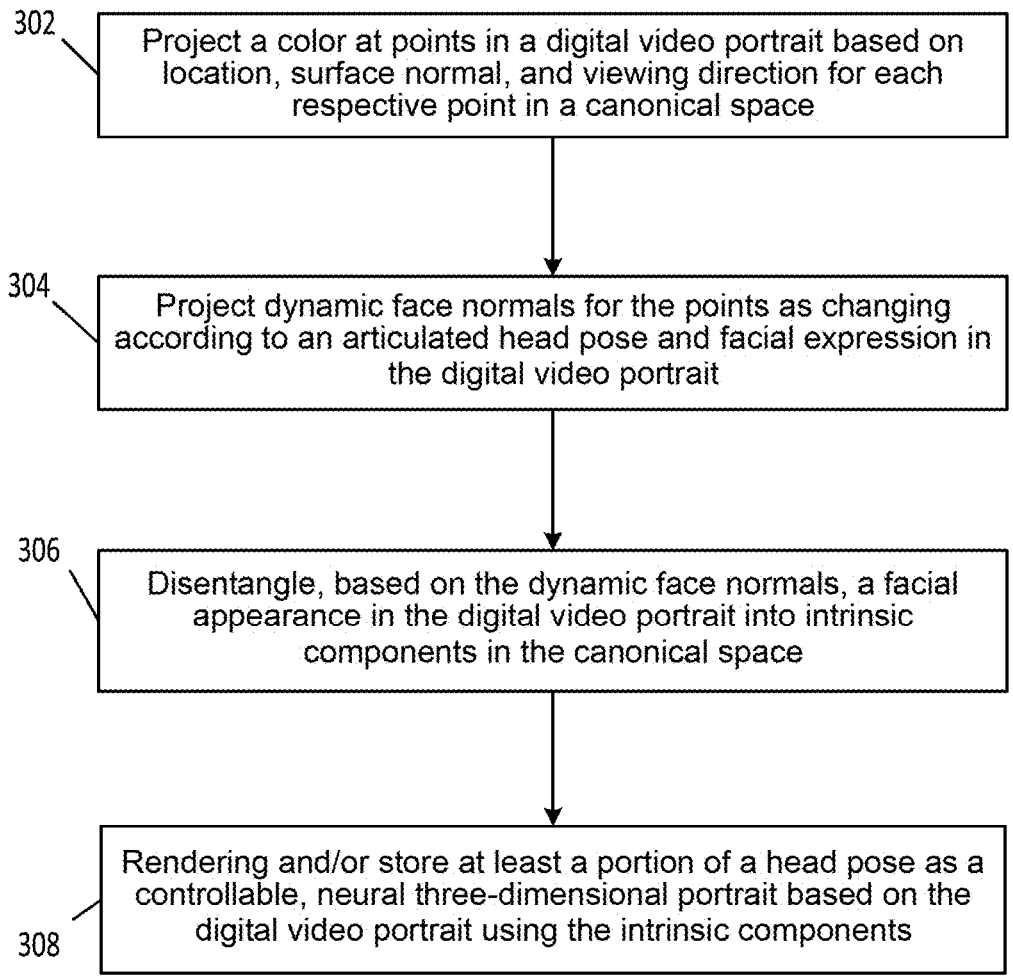
FIG. 3 is a flowchart of an example of a process for controllable, dynamic appearance for neural 3D portraits according to some embodiments.

FIG. 3 is a flowchart of an example of a process 300 for controllable, dynamic appearance for neural 3D portraits according to some embodiments. In this example, a computing device carries out the process by executing suitable program code, for example, computer program code for an application, such as video processing application 102. At block 302, the computing device projects a color at the points or pixels in a digital video portrait. The color is projected based on location, surface normal, and viewing direction for each respective point in a canonical space. The digital video portrait is used for training and in this example is a brief video sequence captured of the individual that is to be the subject of the neural 3D portrait that is produced. The sequence includes the subject making various spatial expressions and camera motion across various viewpoints.

At block 304 in FIG. 3, the computing device projects dynamic face normals for the points as changing according to an articulated head pose and facial expression in the digital video portrait. At block 306, the computing device disentangles a facial appearance in the digital video portrait into intrinsic components in the canonical space. This disentangling is based on the dynamic face normals and provides separate mathematical descriptions of the various lighting and color elements of the image such as shading, albedo, and specularity. A deformable neural radiance field (NeRF), with a per-point 3DMM guided deformation field is used to control the facial expression and head-pose. To ensure the deformation field is trained successfully, the photometric changes in the canonical space are taken into account using a dynamic appearance model. The appearance modeling is conditioned on the surface normals, head-pose and facial expression deformations along with shading and shadowing based cues. The surface normals, defined with world-coordinates in 3D space, are dynamic and vary with head pose and facial expression. These normals are predicted using an MLP as described with respect to FIG. 2 trained with 3DMM normals as a prior.

Continuing with FIG. 3, at block 308, the computing device renders or stores at least a portion of a head pose and expression as a controllable, neural 3D portrait using the intrinsic components. The neural 3D portrait can change facial expression, direction, and head pose while maintaining realistic lighting variations, for example, with facial shadows that move realistically with respect to an apparent light source. For purposes of the description herein, the term "head pose" may include head position, facial expression, or both. This controllable neural portrait is informed by training of the MLPs such as those described with respect to FIG. 2. This training is based on the digital video portrait of an individual captured in order to create the neural 3D portrait. The neural 3D portrait can be directed to make any facial expression desired and to rotate in any direction. These movements are not limited to those captured in the digital video portrait used for training. The portrait is 3D in the sense that it will appear as an accurate representation of the subject through whichever angles the head rotates. In this example, the neural 3D portrait is composed of dynamic RGB values such as the RGB values 212 discussed with respect to FIG. 2.

Figure 4:
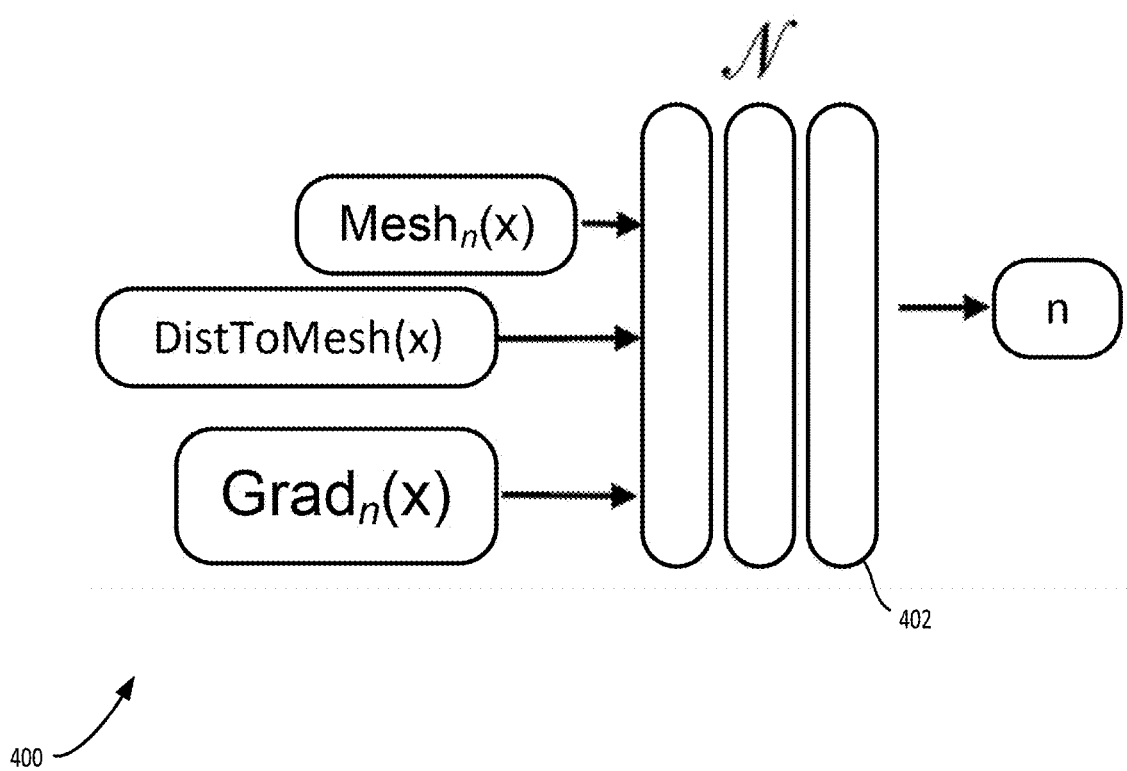
FIG. 4 is an example software architecture for a normals prediction network used in providing controllable, dynamic appearance for neural 3D portraits according to certain embodiments.

FIG. 4 is an example software architecture 400 for a normals prediction network used in providing controllable, dynamic appearance for neural 3D portraits according to certain embodiments. The (MLP) prediction network 402 for normals $\mathcal{N}$ takes as input the mesh normals $Mesh_n(x)$ of a given point x, its distance to the mesh, and the normals given by gradient $Grad_n(x)$ of density field corresponding to an NeRF to produce the normal n.

Modelling of shading and specular effects (through reflection R shown in FIG. 2) on a surface requires accurate normal prediction. One way to calculate the normals within an NeRF is to use a density field where the normal is defined as the negative of its derivative. However, using the negative of the derivative can result in noisy normals. Thus, an MLP such as MLP 402 in FIG. 4 can be used instead. The MLP predicts normals as follows:

$$n = \mathcal{N}(Mesh_n(x), Grad_n(x), DistToMesh(x)),$$

where, $Mesh_n(x)$ is normal vector of the mesh vertex closest to x, $Grad_n(x)$ is the normal calculated by the negative gradient of the density with respect to the input point and $DistToMesh(x)$ is the distance of x to the mesh. With these three inputs, $\mathcal{N}$ can rely on the 3DMM mesh normals for points close to the head, while relying on gradient normals everywhere else.

The prediction of $\mathcal{N}$ is forced to be weakly consistent with the 3DMM on its vertices as follows:

$$\mathcal{R}_{Mesh,n} = \lambda_{Mesh,n} \sum_{v} \|\mathcal{N}(v) - Mesh_n(v)\|,$$

where, v are the vertices of the mesh and $\lambda_{mesh,n}$ is the regularization constant. The normals predicted $\mathcal{N}$ are also forced to forward facing as follows:

$$\mathcal{R}_{dir,n} = \sum_{i} w_i(x_i) \max(0, \mathcal{N}(x_i) \cdot d_i)^2,$$

where, $x_i$ are points along the ray passing through pixel i with direction $d_i$ and $w_i(x_i)$ is the weight of $x_i$ as determined by the expected color of a pixel through which a ray passes, calculated view volume rendering. This calculation will be discussed in more detail below with respect to FIG. 6.

Since regularizations can be applied on the prediction of $\mathcal{N}$, specularities can be learned as subsurface emissive lobes. Further, unless the gradient density normals are themselves accurate, $\mathcal{N}$ cannot use them as a reliable predictor of scene normals. One way to ensure that normals given by negative gradient of the density are accurate is by regularizing them with the prediction of $\mathcal{N}$ as in:

$$\sum_{i} w_i(x_i) \|\mathcal{N}(x_i) - Grad_n(x)\|,$$

however, evaluating the above is very computationally expensive as it requires a second derivative calculation at each point along the ray (usually ~100 points for most NeRF architectures) for each sampled ray in the batch (typically around 1000 rays). One example technique that can be used to reduce the computational burden is to evaluate the above sum only on a subset of the points on a ray as follows:

$$\mathcal{R}_n = \sum_{i} w_i(x'_i) \|\mathcal{N}(x'_i) - Grad_n(x'_i)\|,$$

where, $x'_i \in S_{i,k}$ and $S_{i,k}$ is the set of top k points, sorted by weight $w_i(x'_i)$ of the ray passing through pixel i. However, as the weights predicted by the NeRF are broadly distributed, such regularization does not minimize the above equation over the whole scene consistently. To ensure the predicted weights are more tightly distributed around the surface, a Cauchy regularization can be used to enforce sparsity:

$$\mathcal{R}_{cauchy} = \lambda_c \sum_i \log\left(1 + \frac{\sigma(x_i)^2}{c}\right).$$

This regularization may only be applied to a course MLP. The above two operations can improve the underlying dynamic scene geometry and can significantly improve the quality of the gradient density normals.

Figure 5:
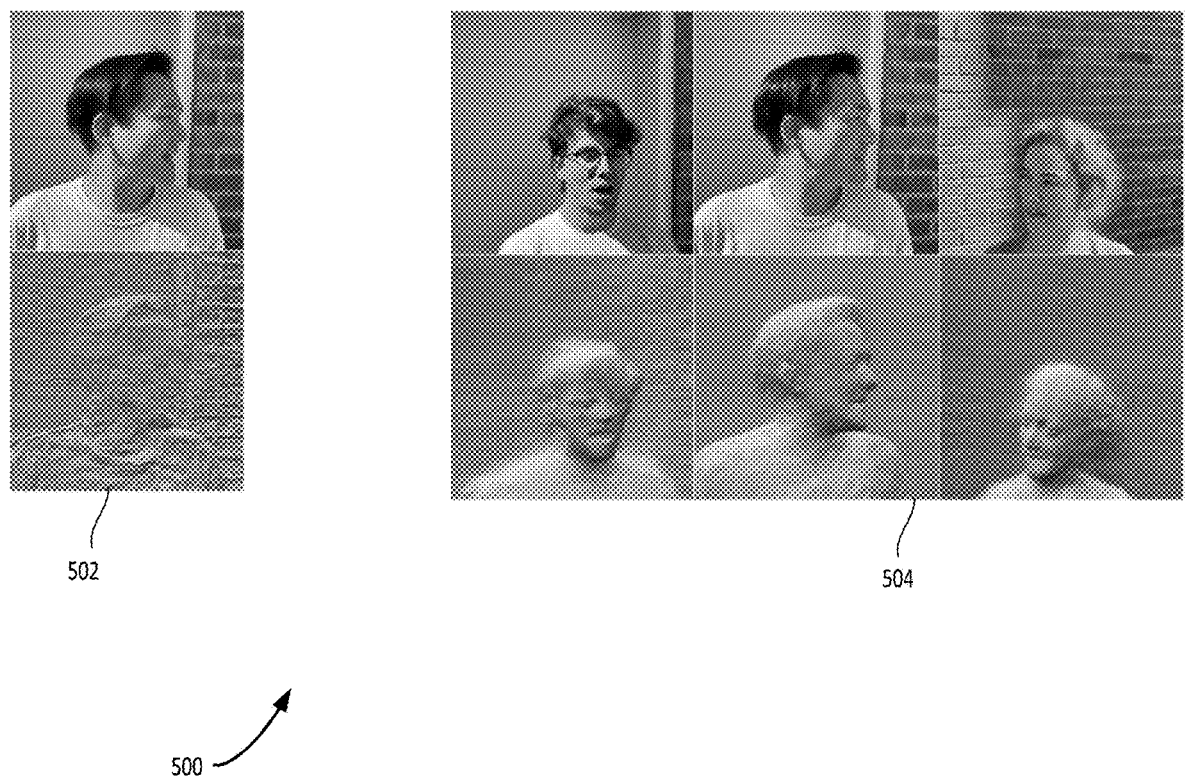
FIG. 5 is an example of images illustrating dynamic face normals used in providing controllable, dynamic appearance for neural 3D portraits according to certain embodiments.

FIG. 5 is an example of images 500 illustrating dynamic face normals used in providing controllable, dynamic appearance for neural 3D portraits according to certain embodiments as described above with respect to FIG. 4. Images 502 illustrate dynamic face normals using only an NeRF. The upper image if a video frame and the bottom image is a visualization of the normals. Note that these normals are noisy and lack definition. Images 504 show three sample video frames of different individuals, with the crisp, well-defined dynamic face normals as determined with the normals prediction architecture of FIG. 4.

Figure 6:
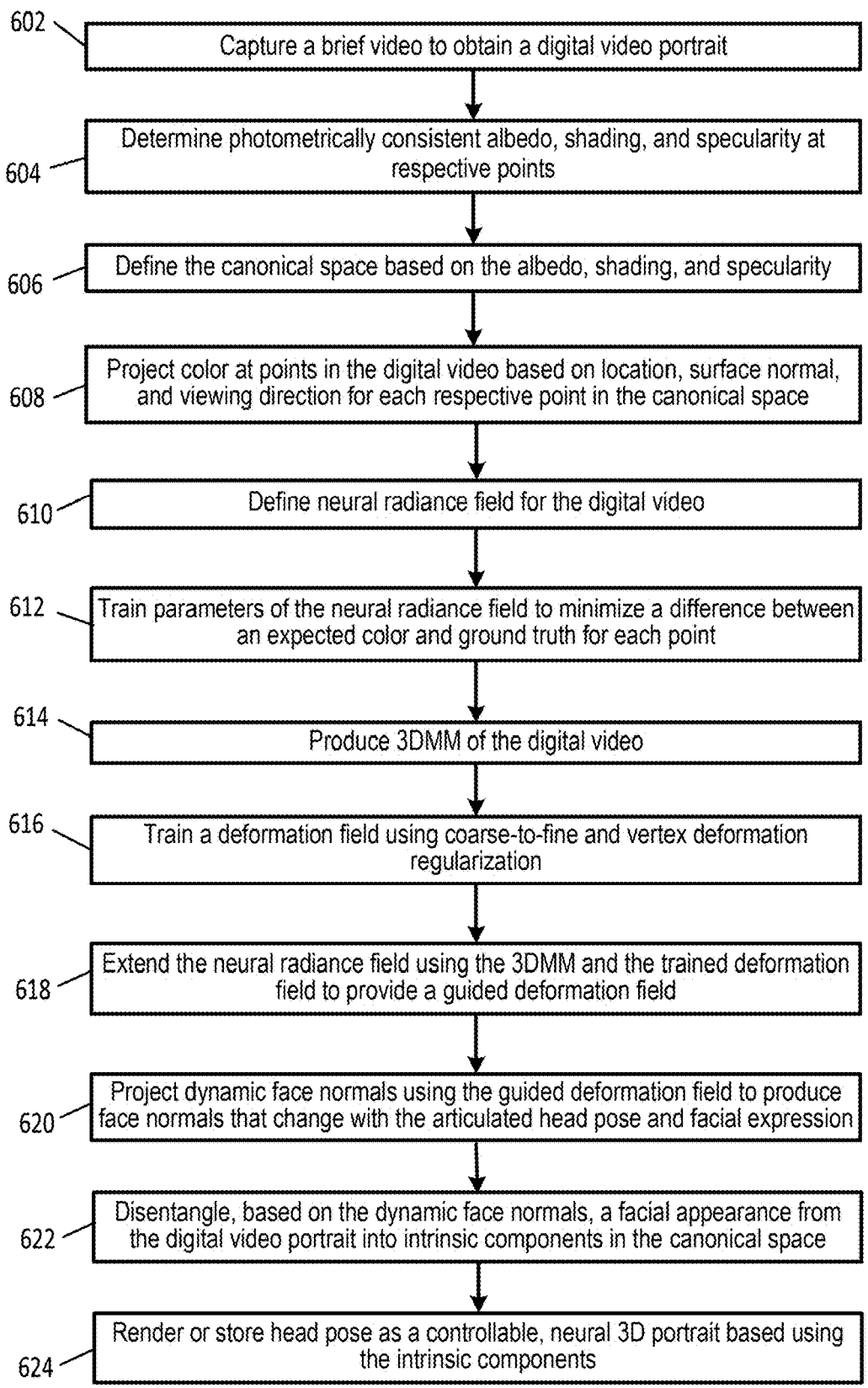
FIG. 6 is a flowchart of another example of a process for controllable, dynamic appearance for neural 3D portraits according to some embodiments.

FIG. 6 is a flowchart of another example of a process 600 for controllable, dynamic appearance for neural 3D portraits according to some embodiments. In this example, one or more computing devices carry out the process by executing suitable program code. More specifically, block 602, the computing device captures a brief video to obtain a digital video portrait for training. This capture can be accomplished via a connected camera or by using a mobile device and transferring the video to a computing device such as computing device 101. In on example, during a first portion of the capture procedure, the subject makes a wide range of expressions and speaks while maintaining a steady head pose as the camera is panned around the subject's head. In a second portion, the camera is fixed at head-level and the subject is asked to rotate their head as they make wide range of facial expressions. Camera parameters can be calculated using structure-from-motion mapping. Expression and shape parameters for each frame in the video can be calculated using detailed expression capture and animation to robustly produce a UV displacement map from a low-dimensional latent representation. These parameters can be further optimized via landmark fitting. The spherical harmonics coefficients $L_{lm}$ can be initialized via photometric optimization using a stable 3D texture space. In one example, training videos are between 40-70 seconds long (~1200-1500 frames) and 120-150 are used for validation.

At block 604 in FIG. 6, the computing device determines a photometrically consistent albedo, the shading, and the specularity at respective points in the digital video portrait frames. An albedo is a mathematical definition of an image that represents its true color under ambient light. This definition does not change even if the ambient light changes. The determined albedo is made to be photometrically consistent, that is, defining color to be the same despite variation in ambient lighting under which the digital video portrait is captured for training. Using this technique, robustness over lighting variations is achieved by discovering the albedo, true lighting, and true pixel color regardless of how an image is rendered; color differences are constant with respect to lighting changes.

Continuing with FIG. 6, at block 606, the computing device defines the canonical space based on the albedo, shading, and specularity. At block 608, the computing device projects color at points in the digital video based on location, surface normal, and viewing direction for each respective point in the canonical space. At block 610, the computing device defines a neural radiance field for the digital video, and at block 612, the computing device trains parameters of the neural radiance field to minimize a difference between an expected color and a ground truth for each respective point. At block 614, the computing device produces a 3DMM of the digital video.

At block 616 of FIG. 6, the computing device trains a deformation field using coarse-to-fine and vertex deformation regularization. At block 618, the computing device extends the neural radiance field using the 3DMM and the trained deformation field to provide a guided deformation field. Training can be accomplished with reduced size images, for example, images resized to 512 by 512 resolution. In such an example, $\lambda_{Mesh,n}$ can be set to 1.0 and can be linearly annealed to 1e-4 over 80k iterations, then set to 2e-2 and linearly annealed to 1e-3 over 20k iterations. $\lambda_c$=1e-7. In the equation for $\mathcal{R}_n$, discussed with respect to FIG. 4, the value of k can be set to 30. Coarse-to-fine and vertex deformation regularization can be used to train the deformation network $D(x_i \omega_i)$.

An NeRF can be defined as a continuous function $F:(\gamma_m(x(t_i)), \gamma_n(d)) \rightarrow (c(x(t_i), d), \sigma(x(t_i)))$ that, given the position of a point in the scene $x(t_i)=o+t_i d$ that lies on a ray originating at o with direction d, outputs the color c=(r,g,b) and the density σ. F can be represented as an MLP and $\gamma_m$: $\mathbb{R}^3 \rightarrow \mathbb{R}^{3+6m}$ is the positional encoding defined as $\gamma_m(x)=(x, \ldots, \sin(2^k x(t_i)), \ldots)$ where m is the total number of frequency bands and $k \in \{0, \ldots, m-1\}$. The expected color of the pixel through which the camera ray passes is calculated via volume rendering as follows:

$$C = \sum_t \omega_t c(x(t));$$

$$\text{where } w_i = \exp\left(-\sum_{j<i} \sigma_j (t_{j+1} - t_j)\right)(1 - \exp(-\sigma_i(t_{i+1} - t_i))).$$

The parameters of F are trained to minimize the L2 distance between the expected color and the ground truth.

NeRFs, as defined above, are designed for static scenes, and offer little or no control over the objects within the scene. In order to model a dynamic scene, NeRFs as described herein can be extended by a deformation field to map each 3D point of the scene to a canonical space, where the volumetric rendering takes place. The deformation field can also be represented by an MLP, $D_i:x \rightarrow x_{can}$, where $D_i$ is defined as $D(x_i \omega_i)=x_{can}$ and $\omega_i$ is a per-frame latent deformation code. In addition to a deformation code, $\omega_i$, a per-frame appearance code, $\phi_i$, can also be used, thus the final radiance field for the i-th frame is as follows:

$$(c(x, d), \sigma(x)) = F(\gamma(D(x, \omega_i)), \gamma(d), \phi_i).$$

A 3DMM prior can be used on the deformation field as follows:

$$\hat{D}(x) =$$
$$3DMMDef(x, \beta_{i,exp}, \beta_{i,pose}) + D(\gamma_a(x), \gamma_b(3DMMDef(x, \beta_{i,exp}, \beta_{i,pose})), \omega_i)$$
$$x_{can} = x + \hat{D}(x),$$

where 3DMMDef(x, $\beta_{i,exp}$, $\beta_{i,exp}$) is the deformation prior given the 3DMM, $\beta_{i,exp}$, $\beta_{i,exp}$ are the articulated facial expression and head-pose of the frame i, and $\gamma a$, $\gamma b$ are the positional encoding functions with frequencies a and b, respectively. The deformation prior is equal to the deformation of the closest point to x on the mesh $\hat{x}$, divided by the exponential distance between x and $\hat{x}$. More specifically, the 3DMM deformation prior can be written as follows:

$$3DMMDef(x, \beta_{i,exp}, \beta_{i,pose}) = \frac{3DMMDef(\hat{x}, \beta_{exp}, \beta_{pose})}{\exp(DistToMesh(x))},$$

where, DistToMesh(x)=$\|x-\hat{x}\|$ is the distance between x and $\hat{x}$ and 3DMMDef($\hat{x}$, $\beta_{exp,can}$, $\beta_{i,pose}$) is the deformation of the vertex x as follows:

$$3DMMDef(\hat{x}, \beta_{exp}, \beta_{pose}) = \hat{x}_{FLAME(\beta_{exp,can},\beta_{pose,can})} - \hat{x}_{FLAME(\beta_{exp},\beta_{pose})},$$

where, $\hat{x}_{FLAME(\beta_{exp,can}, \beta_{pose,can})}$ is the position of x in the canonical space and is its position with head pose and facial expression parameters {$\beta_{exp}$, $\beta_{pose}$}.

Continuing with FIG. 6, at block 620, the computing device projects dynamic face normals using the guided deformation field to produce face normals changing with the articulated head pose and facial expression. At block 622, the computing device disentangles, based on the dynamic face normals, a facial appearance from the digital video portrait into intrinsic components in the canonical space. The functions included in block 618 through 622 and discussed with respect to FIG. 6 can be used in implementing a step for producing, using the color at multiple points, intrinsic components of a controllable neural three-dimensional portrait in the canonical space based on a facial appearance in the digital video portrait. At block 624, the computing device renders, or stores one or more head poses as a controllable, neural 3D portrait based using the intrinsic components.

Disentanglement of the facial appearance can take spatial and illumination characteristics into account. In the canonical space, the computing device predicts the density and a dynamic RGB value, conditioned on the surface normals, head-pose, and expression deformations along with other shading and shadowing cues such as the reflection vector and global location of the head. In this example, the captured neural portrait is a dynamic scene, therefore the outgoing radiance at any point x is implicitly dependent on facial expression and head-pose, {$\beta_{exp,pose}$} (or {$\beta_{e,p}$}) due to surface properties and incoming radiance being dependent on these factors. More specifically, at any point x for a particular articulation of facial expression and head-pose, {$\beta_{e,p}$} is given by the rendering equation:

$$L_r(x, \omega_o, \beta_{e,p}) = \int_{\omega_i} \rho(x, \omega_i, \omega_o, \beta_{e,p})(n \cdot \omega_i) L_i(x, \omega_i, \beta_{e,p}) d\omega_i,$$

where, $\rho$ is the articulation dependent BRDF, n is the normal at x, and $\omega_i$, $\omega_o$ are the incoming and outgoing ray directions, respectively. Outgoing radiance can be approximated using a per-point view dependent neural feature as follows:

$$L_r(x, \omega_o, \beta_{e,p}) = T(x, R, n, \beta_{e,p}) \odot L(n)$$
$$= \sum_{l=0}^{2} \sum_{m=-l}^{l} T_{lm}(x, R, n, \beta_{e,p}) L_{lm} Y_{lm}(n),$$

where T(x, R, n, {$\beta_{e,p}$}) are the neural features, R=2 (d·n)n−d is the reflection vector and $Y_{lm}(n)$ is the spherical harmonics basis. In this example, the first three bands of the basis are used, and $L_{lm}$ is initialized through face fitting.

A spatially conditioned density prediction model can be conditioned on canonical position of a point and its distance to the mesh in the deformed space, with its density predicted as:

$$\sigma(x), \tau = F(\gamma_c(x_{can}), DistToMesh(x)),$$

where, F is an MLP, $\tau$ is a feature vector, DistToMesh(x)=$\|x-\hat{x}\|$ is the distance of x to the closest mesh vertex $\hat{x}$, and $\gamma_c$ is the positional encoding function with c frequencies. Additional conditioning on DistToMesh(x) is necessary in the canonical space as it allows F to distinguish between points in the canonical space that have never been deformed and points that have been deformed to the canonical space.

An illumination aware dynamic canonical appearance model can predict neural features conditioned on inputs that capture local geometry and surface properties along with viewing direction information. More specifically, the neural features can be predicted as follows:

$$T = \mathcal{T}(\tau, n, R, v_{lmk}, 3DMMDef_{exp}, 3DMMDef_{pose}, \phi_i,$$

where, $\tau$ are features from the density prediction network from the equation above for the density prediction model, n is the surface normal, $v_{lmk}$ are the facial landmarks, R the reflection vector, 3DMMDef$_{exp}$: =3DMMDef(x, $\beta_{exp}$, $\beta_{pose,can}$) is the expression-only deformation given by the 3DMM, 3DMMDef$_{pose}$: =3DMMDef(x, $\beta_{exp,can}$, $\beta_{pose}$) is the head-pose only deformation given by the 3DMM and $\phi_i$ is a per-frame latent vector that is learned through optimization. Each input in the above equation contains information that can be used to predict accurate illumination effects. Surface reflectance and absorption properties are captured by $\tau$, which is predicted in the canonical space and thus is forced to only model head-pose deformation independent properties of the surface. The surface normal n is used to model shading effects and, along with the reflection R, specular effects. The face landmarks, $v_{lmk}$, along with expression and head-pose deformations, 3DMMDef$_{exp}$ and 3DMMDef$_{pose}$, are used to model cast shadows, inter-reflections and any other illumination effects that depend on the global orientation of the head as well as deformations due to facial expressions and head-pose.

Figure 7:
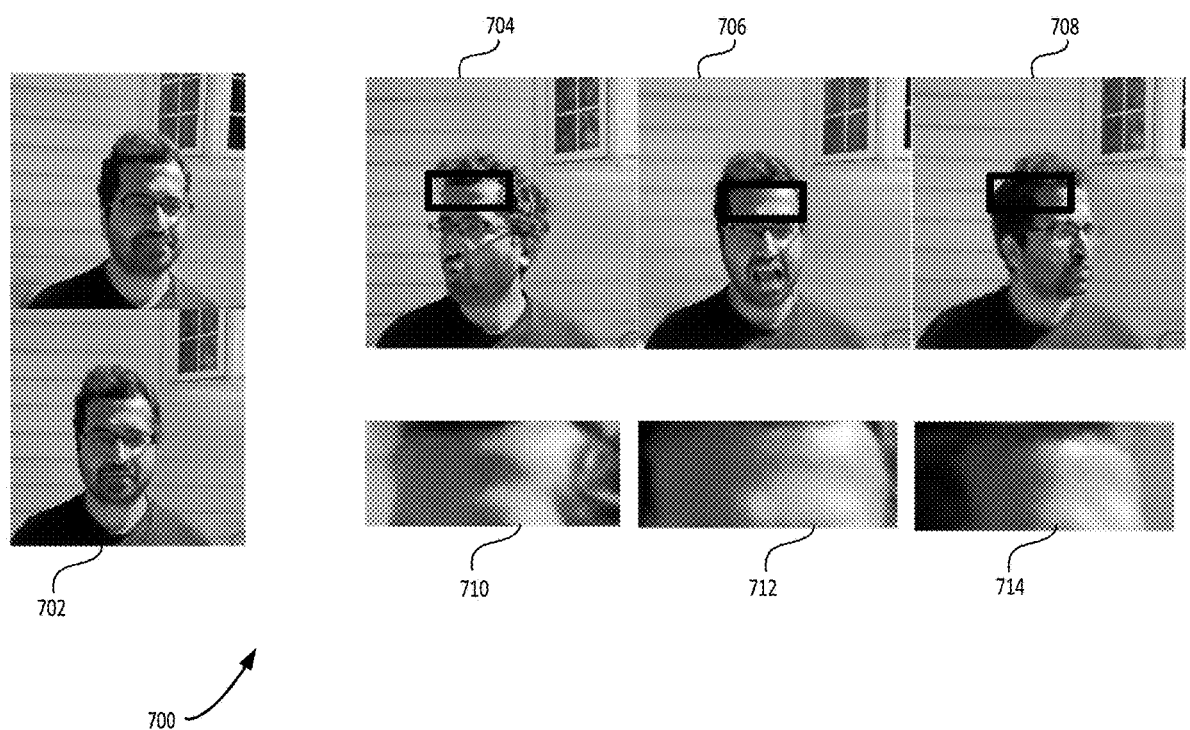
FIG. 7 is an example of images illustrating controllable, dynamic appearance for neural 3D portraits according to certain embodiments.

FIG. 7 is an example of images 700 illustrating controllable, dynamic appearance for neural 3D portraits according to certain embodiments. Image panel 702 show two different poses in a digital video portrait created without using the guided deformation field and the disentanglement into intrinsic components in the canonical space as described above. The shadow on the subject's face does not change with head position, which is unnatural since in the bottom image, the light should illuminate less of the subject's face.

Image 704, image 706, and image 708 in FIG. 7 show three different head poses of the same subject produced using controllable head poses and expressions input to a neural 3D portrait as described above. In each case, an inset is shown below the image. The insets provide a close view of the shadow on the subject's forehead. Inset 710 provides a close view of the forehead in image 704. Inset 712 provides a close view of the forehead in image 706. Inset 714 provides a close view of the forehead in image 708. When the subject appears turned away from the light source more of the subject's forehead is in darkness. As the subject turns to the subject's left, more towards the light source, the subject's forehead illuminates, as would be the case in real life. Such realism can be accomplished with a training video captured on a typical end user computing device such as a smartphone, in almost any lighting.

Figure 8:
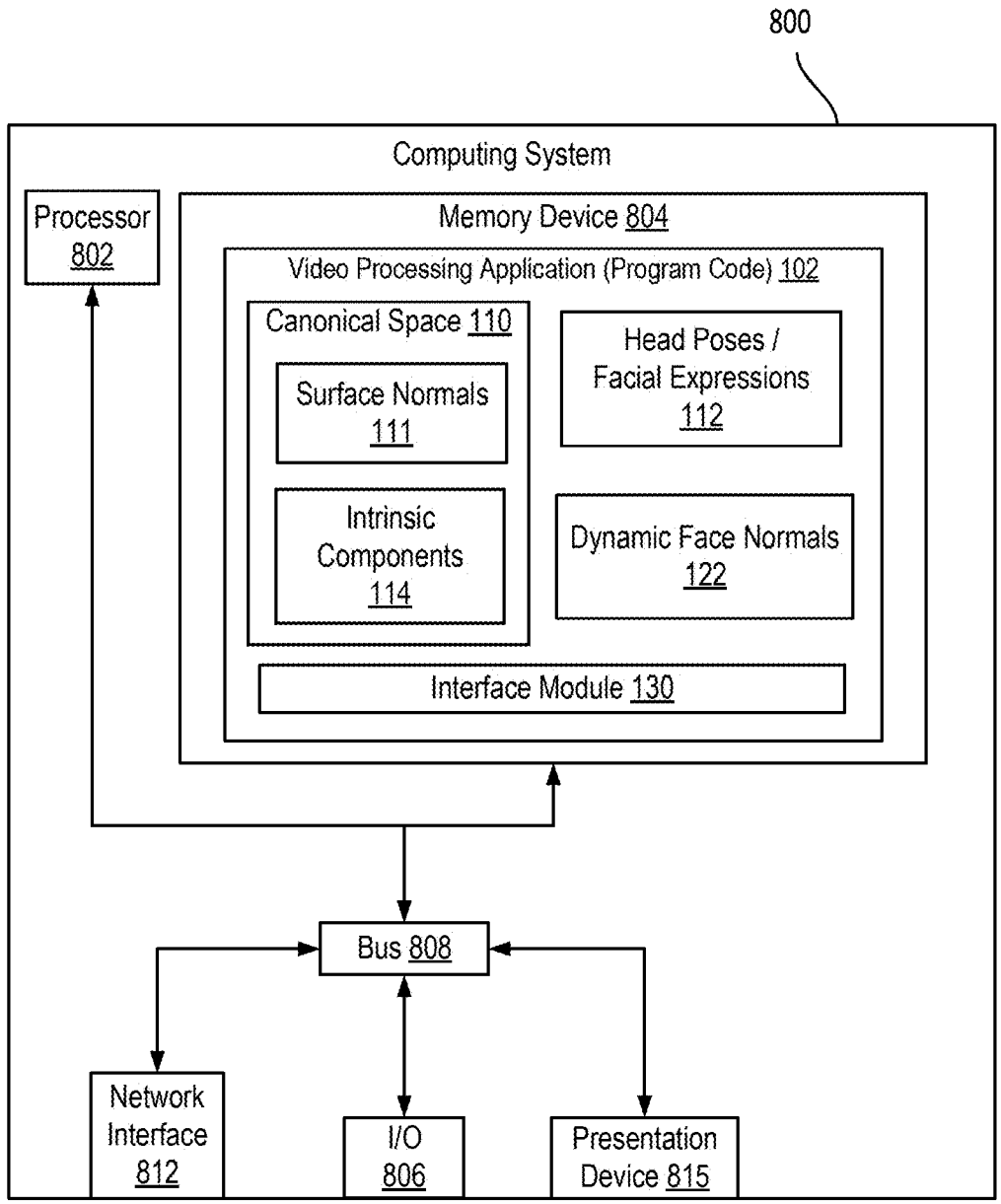
FIG. 8 is a diagram of an example of a computing system that can provide controllable, dynamic appearance for neural 3D portraits according to certain embodiments.

FIG. 8 is a diagram of an example of a computing system 800 that can provide controllable, dynamic appearance for neural 3D portraits according to certain embodiments. System 800 includes a processing device 802 communicatively coupled to one or more memory devices. The processing device 802 executes computer-executable program code stored in the memory component 804. Examples of the processing device 802 include a microprocessor, an application-specific integrated circuit ("ASIC"), a field-programmable gate array ("FPGA"), or any other suitable processing device. The processing device 802 can include any number of processing devices, including a single processing device. The memory component 804 includes any suitable non-transitory computer-readable medium for storing data, program code instructions, or both. A computer-readable medium can include any electronic, optical, magnetic, or other storage device capable of providing a processor with computer-readable, executable instructions or other program code. The memory component can include multiple memory devices to provide a computer-readable medium. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, and JavaScript.

Still referring to FIG. 8, the computing system 800 may also include a number of external or internal devices, for example, input or output devices. For example, the computing system 800 is shown with one or more input/output ("I/O") interfaces 806. An I/O interface 806 can receive input from input devices or provide output to output devices (not shown). Output may be provided using the interface module 130 of the video processing application 102. One or more buses 808 are also included in the computing system 800. The bus 808 communicatively couples one or more components of a respective one of the computing system 800. The processing device 802 executes program code that configures the computing system 800 to perform one or more of the operations described herein. The program code includes, for example, video processing application 102 or other suitable applications that perform one or more operations described herein. The program code may be resident in the memory component 804 or any suitable computer-readable medium and may be executed by the processing device 802 or any other suitable processor. Memory component 804, during operation of the computing system, can store the intrinsic components 114 surface normals 111 in the canonical space 110. The memory component 804 can also store descriptive data for the head poses and facial expressions 112. Memory component 804 is also used to store the dynamic face normals 122.

The system 800 of FIG. 8 also includes a network interface device 812. The network interface device 812 includes any device or group of devices suitable for establishing a wired or wireless data connection to one or more data networks. Non-limiting examples of the network interface device 812 include an Ethernet network adapter, a wireless network adapter, and/or the like. The system 800 is able to communicate with one or more other computing devices (e.g., another computing device executing other software, not shown) via a data network (not shown) using the network interface device 812. Network interface device 812 can also be used to communicate with network or cloud storage used as a repository for training digital video portraits, stored controllable 3D neural portraits, and updated or archived versions of the video processing application 102 for distribution and installation.

Staying with FIG. 8, in some embodiments, the computing system 800 also includes the presentation device 815. A presentation device 815 can include any device or group of devices suitable for providing visual, auditory, or other suitable sensory output. In examples, presentation device 815 displays input and/or rendered images. Non-limiting examples of the presentation device 815 include a touch-screen, a monitor, a separate mobile computing device, etc. In some aspects, the presentation device 815 can include a remote client-computing device that communicates with the computing system 800 using one or more data networks. System 800 may be implemented as a unitary computing device, for example, a notebook or mobile computer. Alternatively, as an example, the various devices included in system 800 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "determining," and "accessing" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. Comparative terms such as "more" or "less" are intended to encompass the notion of quality. Thus, expressions such as "less than" should be interpreted to mean "less than or equal to."

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
projecting a color at a plurality of points in a digital video portrait based on a location, a surface normal, and a viewing direction for each respective point in a canonical space;
defining a neural radiance field as a continuous function that outputs color and density for the digital video portrait regardless of lighting;
providing, using the neural radiance field for the digital video portrait, a guided deformation field;
projecting, using the color and based on the guided deformation field, a dynamic face normal relative to a surface at each respective point of the plurality of points as changed relative to the surface normal based on an articulated head pose and facial expression in the digital video portrait;
disentangling, based on the dynamic face normal for each respective point of the plurality of points, a facial appearance in the digital video portrait into a plurality of intrinsic components in the canonical space; and
rendering at least a portion of a head pose as a controllable, neural three-dimensional portrait based on the digital video portrait using the plurality of intrinsic components.

2. The method of claim 1, further comprising:
photographically capturing the digital video portrait; and
projecting a photometrically consistent albedo using the digital video portrait to project the color at the plurality of points.

3. The method of claim 1, further comprising defining the canonical space with respect to a photometrically consistent albedo for the digital video portrait.

4. The method of claim 1, further comprising:
determining a photometrically consistent albedo, a shading, and a specularity at each respective point to project the color, wherein the photometrically consistent albedo represents a constant color, defined to be the same despite variations in ambient light under which the digital video portrait is captured for training; and
defining the canonical space based on the photometrically consistent albedo, the shading, and the specularity.

5. The method of claim 1, further comprising deforming each of the plurality of points using the guided deformation field to provide the dynamic face normal.

6. The method of claim 5, further comprising:
training parameters of the neural radiance field to minimize a difference between an expected color and ground truth for each of the plurality of points;
training a deformation field using coarse-to-fine and vertex deformation regularization; and
extending the neural radiance field using the deformation field and the parameters as trained to produce the guided deformation field.

7. The method of claim 1, further comprising:
producing a three-dimensional morphable model of the digital video portrait; and
accessing the three-dimensional morphable model for each of the plurality of points to provide the guided deformation field for each respective point of the plurality of points.

8. A system comprising:
a memory component; and
a processing device coupled to the memory component, the processing device to perform operations comprising:
projecting a color at a plurality of points in a digital video portrait based on a location, a surface normal, and a viewing direction for each respective point in a canonical space;
defining a neural radiance field as a continuous function that outputs color and density for the digital video portrait regardless of lighting;
providing, using a neural radiance field for the digital video portrait, a guided deformation field;
projecting, using the color and the guided deformation field, a dynamic face normal relative to a surface at each respective point of the plurality of points as changed relative to the surface normal based on an articulated head pose and facial expression in the digital video portrait;
disentangling, based on the dynamic face normal for each respective point of the plurality of points, a facial appearance in the digital video portrait into a plurality of intrinsic components in the canonical space; and
rendering or storing at least a portion of a head pose as a controllable, neural three-dimensional portrait based on the digital video portrait using the plurality of intrinsic components.

9. The system of claim 8, wherein the operations further comprise:
- photographically capturing the digital video portrait; and
- projecting a photometrically consistent albedo using the digital video portrait to project the color at the plurality of points.

10. The system of claim 8, wherein the operations further comprise defining the canonical space with respect to a photometrically consistent albedo for the digital video portrait.

11. The system of claim 8, wherein the operations further comprise:
- determining a photometrically consistent albedo, a shading, and a specularity at each respective point to project the color, wherein the photometrically consistent albedo represents a constant color, defined to be the same despite variations in ambient light under which the digital video portrait is captured for training; and
- defining the canonical space based on the photometrically consistent albedo, the shading, and the specularity.

12. The system of claim 8, wherein the operations further comprise deforming each of the plurality of points using the guided deformation field to provide the dynamic face normal.

13. The system of claim 12, wherein the operations further comprise:
- training parameters of the neural radiance field to minimize a difference between an expected color and ground truth for each of the plurality of points;
- training a deformation field using coarse-to-fine and vertex deformation regularization; and
- extending the neural radiance field using the deformation field and the parameters as trained to produce the guided deformation field.

14. The system of claim 8, wherein the operations further comprise:
- producing a three-dimensional morphable model of the digital video portrait; and
- accessing the three-dimensional morphable model for each of the plurality of points to provide the guided deformation field for each respective point of the plurality of points.

15. A non-transitory computer-readable medium storing executable instructions, which when executed by a processing device, cause the processing device to perform operations comprising:
- projecting a color at a plurality of points in a digital video portrait based on location, surface normal, and viewing direction for each respective point in a canonical space;
- defining a neural radiance field as a continuous function that outputs color and density for the digital video portrait regardless of lighting;
- providing, using a neural radiance field for the digital video portrait, a guided deformation field;
- a step for producing, using the color at the plurality of points and based on the guided deformation field, intrinsic components of a controllable, neural three-dimensional portrait in the canonical space based on a facial appearance in the digital video portrait; and
- rendering at least a portion of a head pose using the controllable, neural three-dimensional portrait using the intrinsic components.

16. The non-transitory computer-readable medium of claim 15, wherein the executable instructions further cause the processing device to perform operations comprising:
- photographically capturing the digital video portrait; and
- projecting a photometrically consistent albedo using the digital video portrait to project the color at the plurality of points.

17. The non-transitory computer-readable medium of claim 15, wherein the executable instructions further cause the processing device to perform operations comprising defining the canonical space with respect to a photometrically consistent albedo for the digital video portrait.

18. The non-transitory computer-readable medium of claim 15, wherein the executable instructions further cause the processing device to perform operations comprising:
- determining a photometrically consistent albedo, a shading, and a specularity at each respective point to project the color, wherein the photometrically consistent albedo represents a constant color, defined to be the same despite variations in ambient light under which the digital video portrait is captured for training; and
- defining the canonical space based on the photometrically consistent albedo, the shading, and the specularity.

19. The non-transitory computer-readable medium of claim 15, wherein the executable instructions further cause the processing device to perform operations comprising:
- training parameters of the neural radiance field to minimize a difference between an expected color and ground truth for each of the plurality of points;
- training a deformation field using coarse-to-fine and vertex deformation regularization; and
- extending the neural radiance field using the deformation field and the parameters as trained to produce a guided deformation field.

20. The non-transitory computer-readable medium of claim 15, wherein the executable instructions further cause the processing device to perform operations comprising:
- producing a three-dimensional morphable model of the digital video portrait; and
- accessing the three-dimensional morphable model for each of the plurality of points to provide the guided deformation field for each respective point of the plurality of points.

* * * * *